US009001767B1

(12) United States Patent
Gatewood et al.

(10) Patent No.: US 9,001,767 B1
(45) Date of Patent: Apr. 7, 2015

(54) SELECTION OF WIRELESS BACKHAUL LINKS BASED ON UPTIME FACTORS

(71) Applicant: Sprint Communications Company L.P., Overland Park, KS (US)

(72) Inventors: John Gatewood, Lee's Summit, MO (US); Matthew P. Hund, Olathe, KS (US); Bhanu Prakash Voruganti, Overland Park, KS (US); Lee Alan Schnitzer, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 119 days.

(21) Appl. No.: 13/787,313

(22) Filed: Mar. 6, 2013

(51) Int. Cl.
*H04W 36/00* (2009.01)
*H04W 72/04* (2009.01)

(52) U.S. Cl.
CPC ..................................... *H04W 72/04* (2013.01)

(58) Field of Classification Search
CPC ..... H04W 16/24; H04W 16/32; H04W 40/32; H04W 56/001–56/004; H04W 56/0015; H04W 74/08; H04W 74/088; H04W 74/0816; H04W 36/00; H04W 72/04

USPC ............ 370/310, 324, 350, 395.62, 328–329, 370/338–339, 341; 455/443–444, 446, 455/448–450, 464, 502, 524–525
See application file for complete search history.

(56) References Cited

U.S. PATENT DOCUMENTS

| | | | |
|---|---|---|---|
| 8,244,249 B1* | 8/2012 | Everson et al. | 455/436 |
| 8,358,577 B1* | 1/2013 | Khanka et al. | 370/221 |
| 8,488,514 B2* | 7/2013 | Cai et al. | 370/315 |
| 2007/0155375 A1* | 7/2007 | Kappel et al. | 455/422.1 |
| 2009/0196277 A1* | 8/2009 | Horn et al. | 370/350 |
| 2010/0008291 A1 | 1/2010 | LeBlanc et al. | |
| 2011/0002297 A1 | 1/2011 | Jain et al. | |
| 2012/0026865 A1* | 2/2012 | Fan et al. | 370/225 |

* cited by examiner

*Primary Examiner* — Charles C Jiang
*Assistant Examiner* — Mohamed Kamara

(57) ABSTRACT

Systems, methods, and software for providing a wireless local area network to user devices using a wireless access node are provided herein. In one example, a method of operating a wireless access node is provided. The method includes providing a wireless local area network for user devices, selecting a first wireless backhaul link for communications of the wireless local area network from among a plurality of wireless links provided by a plurality of wireless access nodes based on at least signal strengths of the wireless links, and selecting a second wireless backhaul link as a backup for the first wireless backhaul link from among the plurality of wireless links based on at least the signal strengths and uptime information of the wireless links.

20 Claims, 5 Drawing Sheets

SELECTION OF WIRELESS BACKHAUL LINKS BASED ON UPTIME FACTORS

TECHNICAL FIELD

Aspects of the disclosure are related to the field of communications, and in particular, selection of wireless backhaul links for wireless access nodes in wireless communication networks.

TECHNICAL BACKGROUND

Wireless user devices, such as computers, smartphones, gaming devices, or other devices, are typically able to connect to communication services, such as Internet services, through wireless access point devices. These access points provide a wireless local area network for the user devices to communicate with the access points and also to access communication services.

Wired local area networks can include Ethernet networks, among other examples, and wireless local area networks can include Wi-Fi-style local area wireless networks, among other examples. Access points can include router, gateway, or bridge functionality to connect user devices on the provided local area networks to other networks and systems, such as the Internet or other packet networks. In some examples, access points also include radio equipment for bridging communications of the local area network through a second wireless communication system, such as through a base station of a cellular communication system.

To provide the wireless local area network, a backhaul link can be employed to transport the communications of the wireless local area network to other networks, such as the Internet or other local area networks and wide area networks. However, when a backhaul link is wireless, it can be subjected to frequent downtimes due to wireless transmission issues of the wireless backhaul link.

Overview

Systems, methods, and software for providing a wireless local area network to user devices using a wireless access node are provided herein. In one example, a method of operating a wireless access node is provided. The method includes providing a wireless local area network for user devices, selecting a first wireless backhaul link for communications of the wireless local area network from among a plurality of wireless links provided by a plurality of wireless access nodes based on at least signal strengths of the wireless links, and selecting a second wireless backhaul link as a backup for the first wireless backhaul link from among the plurality of wireless links based on at least the signal strengths and uptime information of the wireless links.

In another example, a wireless access node is provided. The wireless access node includes a transceiver system configured to provide a wireless local area network for user devices. The wireless access node also includes a processor configured to select a first wireless backhaul link for communications of the wireless local area network from among a plurality of wireless links provided by a plurality of wireless access nodes based on at least signal strengths of the wireless links. The processor is also configured to select a second wireless backhaul link as a backup for the first wireless backhaul link from among the plurality of wireless links based on at least the signal strengths and uptime information of the wireless links.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
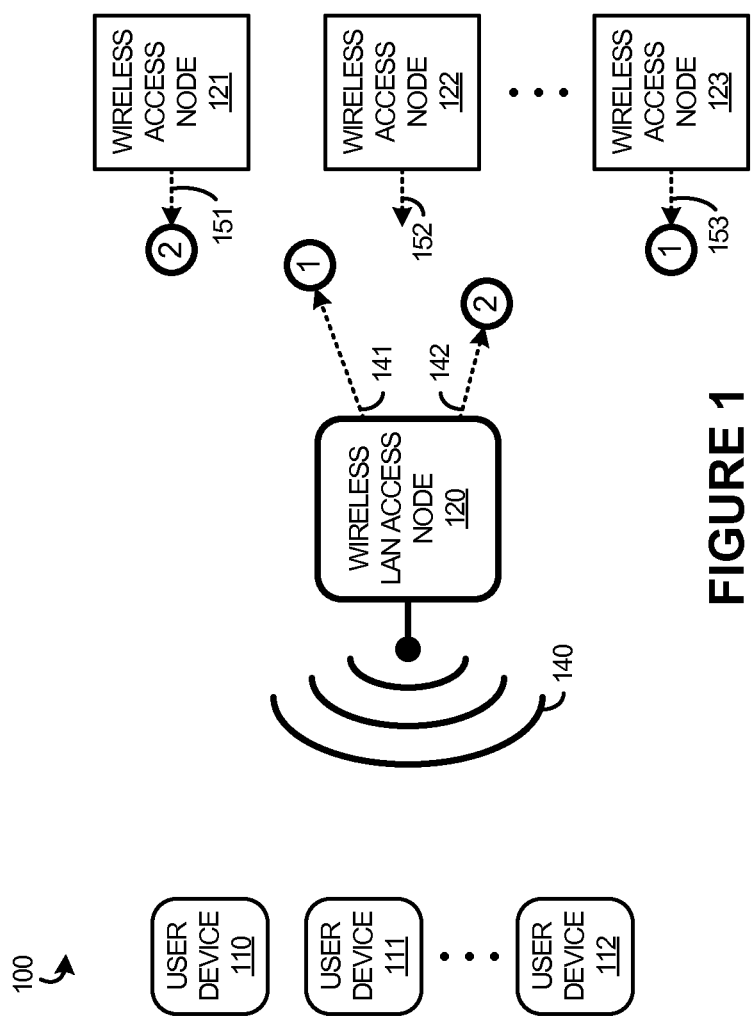
FIG. 1 is a system diagram illustrating a communication system.

FIG. 1 is a system diagram illustrating communication system 100. Communication system 100 includes user devices 110-112, wireless local area network (WLAN) access node 120, and wireless access nodes 121-123. User devices 110-112 and WLAN access node 120 can communicate over WLAN 140. WLAN access node 120 and ones of wireless access nodes 121-123 can communicate over wireless backhaul links 141-142. In some examples, WLAN access node 120 and wireless access nodes 121-123 comprise similar devices or equipment, such as in a mesh wireless local area network. In other examples, wireless access nodes 121-123 can comprise cellular voice and data base station equipment, or other wireless equipment.

In operation, WLAN access node 120 provides a wireless local area network, namely WLAN 140, for user devices 110-112 to access communication services, such as Internet access, data exchange, network services, video streaming, web access, and the like. Backhaul for these communications of WLAN 140 is provided by WLAN access node over one or more of wireless backhaul links 141-142 by way of ones of wireless access nodes 121-123.

Figure 2:
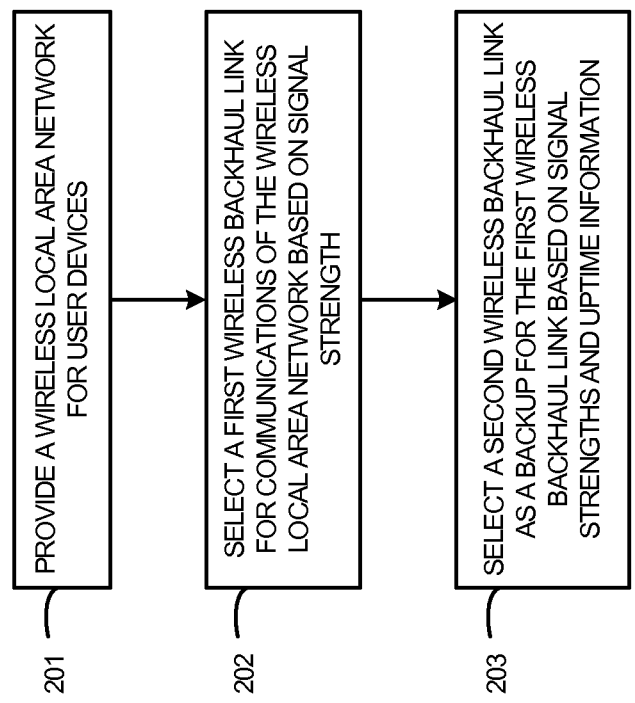
FIG. 2 is a flow diagram illustrating a method of operation of a wireless local area network access node.

FIG. 2 is a flow diagram illustrating a method of operation of WLAN access node 120. The operations of FIG. 2 are referenced below parenthetically. In FIG. 2, WLAN access node 120 provides (201) wireless local area network (WLAN) 140 for user devices 110-112. WLAN 140 can include any wireless local area network, such as packet networks, wireless Ethernet networks, Wireless Fidelity (Wi-Fi), IEEE 802.11, or other wireless networks, including variations, combinations, and improvements thereof. WLAN 140 can be identified to user devices by an identifier, such as a subscriber set identifier (SSID), network identifier, media access control (MAC) address, frequency, channel, and the like. When connected to WLAN 140, user devices 110-112 can exchange communications with other endpoints and networks, such as with other ones of user devices 110-112, or other networks such as the Internet. Although three user devices are included in FIG. 1, it should be understood than any number of user devices can be included.

To provide WLAN 140, WLAN access node 120 also communicates over backhaul links to exchange communications of WLAN 140 and user devices 110-112 with other networks. In FIG. 1, wireless access nodes 121-123 have associated wireless links 151-153. These wireless links can be used by WLAN access node 120 as backhaul links, and must first be selected by WLAN access node 120. Wireless links 151-153 can be of a similar wireless communication protocol or wireless communication standard as WLAN 140, such as in a mesh communication configuration, although other wireless technologies can be employed.

WLAN access node 120 selects (202) a first wireless backhaul link for communications of WLAN 140 based on signal strength. Each of wireless links 151-153 can have an associated signal strength as detected by WLAN access node 120. This signal strength can include a measurement by WLAN access node 120 and represented in decibels, watts/meter$^2$, current data rate, current bandwidth, or other measurements of signal strength such as power or signal level. In this example, wireless link 153 associated with wireless access node 133 has the highest signal strength, and thus WLAN access node 120 selects wireless link 153 as the first wireless backhaul link. As shown in FIG. 1, the "1" indicator illustrates wireless backhaul link 141 and wireless link 153 as being associated together for the first wireless backhaul link.

WLAN access node 120 selects (203) a second wireless backhaul link as a backup for the first wireless backhaul link based on signal strengths and uptime information. As discussed in operation 202, each of wireless links 151-153 can have an associated signal strength as detected by WLAN access node 120. Also, each of wireless links 151-153 can have an associated uptime for the respective wireless link. Uptime information can reflect a time period that the associated wireless link has been active and capable of carrying communications. For example, the uptime can be measured in minutes, hours, days, and the like, and indicate how stable the associated wireless link or wireless access node has been. WLAN access node 120 processes at least the signal strengths and uptime information for each of wireless links 151-153 to select one of wireless links 151-153 for use as the second wireless backhaul link. Since wireless link 153 has already been selected as the first wireless backhaul link in operation 202, WLAN access node 120 selects from among wireless links 151-152 for the second wireless backhaul link. In this example, wireless link 151 has the highest signal strength and the longest uptime among wireless links 151-152, and thus wireless link 151 is selected as the second wireless backhaul link. As shown in FIG. 1, the "2" indicator illustrates wireless backhaul ink 142 and wireless link 151 as being associated together for this second wireless backhaul link.

Figure 3:
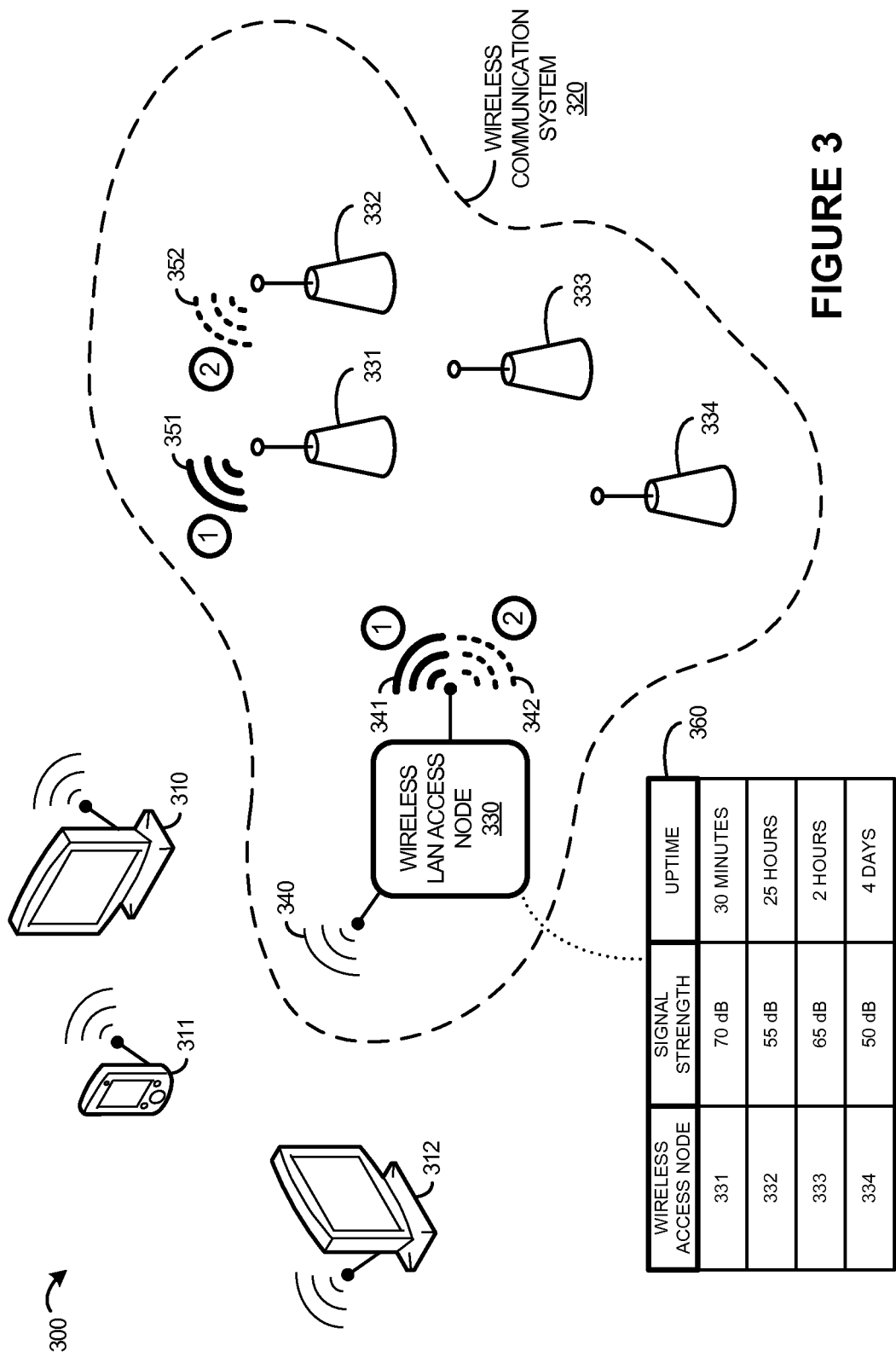
FIG. 3 is a system diagram illustrating a communication system.

FIG. 3 is a system diagram illustrating communication system 300. Communication system 300 includes various user devices 310-312 and wireless local area network (WLAN) access nodes 330-334 which comprise wireless communication system 320. In this example, WLAN access node 330 comprises a wireless local area network access point and wireless router, such as an IEEE 802.11 wireless router. In some examples, WLAN access nodes 331-334 comprise similar devices or equipment as WLAN access node 330, such as in a mesh wireless local area network. In other examples, WLAN access nodes 331-334 can comprise cellular voice and data base station equipment, or other wireless equipment.

WLAN access nodes 331-334 are also communicatively coupled to further networks, communication links, and systems which can provide communication with other networks such as the Internet, corporate networks, Internet service providers, cellular voice and data core networks, and the like. Although not shown in FIG. 3, each of WLAN access nodes 331-334 can have one or more additional wired or wireless links for communication with these further networks or communication links. Thus, any communications backhauled through ones of WLAN access nodes 331-334, as discussed in FIG. 4, can be further exchanged over these additional wired or wireless links with the further networks or communication links.

FIG. 3 also includes data structure 360, which is stored in WLAN access node 330. Data structure 360 includes three columns. A first column indicates an identity of a wireless access node, namely WLAN access nodes 331-334. A second column indicates a signal strength, namely a corresponding signal strength in decibels (dB) as detected by WLAN access node 330 for each WLAN access node 331-334. A third column indicates uptime information, namely an uptime period corresponding to each WLAN access node 331-334. Data structure 360 can be stored in a data storage device or computer readable storage medium of WLAN access node 330, and be processed by a processing system or processor portion of WLAN access node 330.

Figure 4:
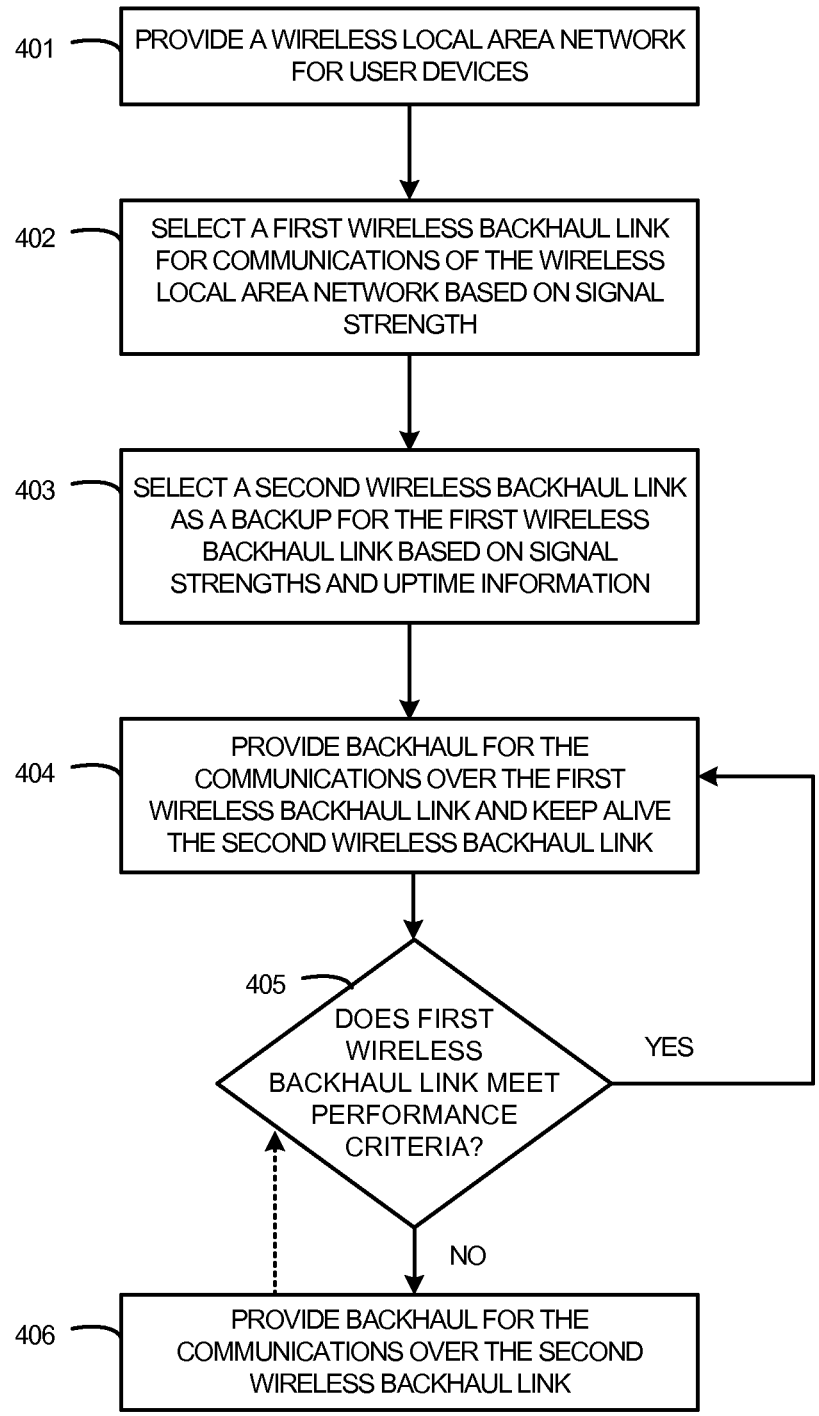
FIG. 4 is a flow diagram illustrating a method of operation of a communication system.

FIG. 4 is a flow diagram illustrating a method of operation of communication system 300. The operations of FIG. 4 are referenced below parenthetically. In FIG. 4, WLAN access node 330 provides (401) a WLAN for user devices. In this example, WLAN access node 330 provides WLAN 340 for at least user devices 310-312. WLAN 340 is an IEEE 802.11 wireless local area network in this example. Each of user devices 310-312 has a corresponding wireless networking portion which can communicate with at least WLAN access node 340, as indicated by the antenna portions of each element in FIG. 3.

WLAN access node 330 selects (402) a first wireless backhaul link for communications of WLAN 340 based on signal strength of wireless links provided by ones of WLAN access nodes 331-334. To transfer communications from user devices on WLAN 340 and to receive communications transferred for user devices WLAN 340, a backhaul link is employed. This backhaul link can be a link between WLAN access node 330 and other wireless access nodes which provides access to the Internet, an Internet service provider (ISP), other networks, or other communication links.

However, in this example, a backhaul link is provided over a wireless link by a wireless access node, such as with one of WLAN access nodes 331-334. The first backhaul wireless link is selected from among a wireless link associated with WLAN access nodes 331-334 based on at least a signal strength of the associated wireless link as measured or detected by WLAN access node 330. Example signal strengths are indicated in data structure 360 in FIG. 3, namely 70 decibels (dB) for WLAN access node 331, 55 dB for WLAN access node 332, 65 dB for WLAN access node 333, and 50 dB for WLAN access node 334. Since WLAN access node 331 has the highest signal strength in this example, WLAN access node 330 selects WLAN access node 331 for the first wireless backhaul link, as indicated by wireless link 341 and the '1' indicator in FIG. 3. Instead of or in addition to the highest signal strength, other signal strength related factors can be considered, such as proximity of ones of WLAN access nodes 331-334 to WLAN access node 330, data rate of wireless links provided by ones of WLAN access nodes 331-334, or other factors, including combinations thereof.

WLAN access node 330 selects (403) a second wireless backhaul link as a backup for first wireless backhaul link 341 based on signal strength and uptime information. The backup for first wireless backhaul link 341 is selected to provide failover or backup protection for communications of WLAN 340 when first wireless backhaul link 341 is unavailable, underperforming, or does not meet performance criteria, among other scenarios. This backup backhaul link can be a link between WLAN access node 330 and other wireless access nodes which provide access to the Internet, an Internet service provider (ISP), other networks, or other communication links.

As discussed above, backhaul links are provided over wireless links by wireless access nodes, such as with one of WLAN access nodes 331-334. The second wireless backhaul link is selected from among a wireless link associated with WLAN access nodes 331-334 based on at least a signal strength and uptime information of the associated wireless link. The signal strengths can be measured or detected by WLAN access node 330 as in operation 402. Example signal strengths are indicated in data structure 360 in FIG. 3. The uptime information can be obtained from each of WLAN access nodes 331-334 as monitored by WLAN access nodes 331-334, can be monitored by WLAN access node 330, or can be monitored by a separate monitoring node not shown in FIG. 3 for clarity. The uptime information can comprise a time period that a particular wireless link, WLAN, or WLAN access node has met certain performance criteria, such as being operational, being functional, providing a WLAN or wireless link, having met a minimum performance threshold, or not failed, among other performance criteria. As indicated in example data structure 360 of FIG. 3, WLAN access node 331 has an uptime of 30 minutes, WLAN access node 332 has an uptime of 25 hours, WLAN access node 333 has an uptime of 2 hours, and WLAN access node 334 has an uptime of 4 days.

In this example, both signal strength and uptime information is considered in selecting the second backhaul wireless link as the backup to first wireless backhaul link 341. Also, WLAN access node 331 has already been selected for first wireless backhaul link 341, and only WLAN access nodes 332-334 remain for selection for the second backhaul wireless link. WLAN access node 333 has the highest signal strength from among WLAN access nodes 332-334, while WLAN access node 334 has the longest uptime. However, in this example, both signal strength and uptime information is considered, and thus WLAN access node 332 is selected due in part to having the highest signal strength and longest uptime combination from among WLAN access nodes 332-334. WLAN access node 330 thus selects WLAN access node 332 for the second wireless backhaul link, as indicated by wireless link 342 and the '2' indicator in FIG. 3.

A weighting calculation can be employed to balance signal strength and uptime considerations, such as giving an uptime measurement more weight in the selection process than a signal strength or vice versa. Thus, in some examples, WLAN access node 334 could be selected based on having the longest uptime among WLAN access nodes 332-334. In other examples, WLAN access node 333 is selected based on having the highest signal strength among WLAN access nodes 332-334. In other examples, both signal strength and uptime information are given roughly equal weight in selecting the second backhaul wireless link.

WLAN access node 330 provides (404) backhaul for the communications over first wireless backhaul link 341 and keeps alive second wireless backhaul link 342. Providing backhaul over first wireless backhaul link 341 includes transferring communications from user devices 310-312 over first wireless backhaul link 341 and receiving communications transferred to user devices 310-312 over first wireless backhaul link 341. These communications can include any network communications including user communications, web pages, email, data exchange, phone calls, video communications, audio communications, or other user communications associated with user devices 310-312.

Keeping active second wireless backhaul link 342 can include keeping active second wireless backhaul link 342 when the performance criteria for first wireless backhaul link 341 is met. Thus, second backhaul link 342 might not presently carry user communications of user devices 310-312 or communications of WLAN 340 when first wireless backhaul link 341 is in use, but second wireless backhaul link 342 can still be maintained in an active state. Keep alive messages can be periodically transferred over second wireless backhaul link 342. The keep alive messages can comprise packets or other communications which prevent second wireless backhaul link 342 from being disconnected or otherwise halted by either of WLAN access node 330 or WLAN access node 332.

When first wireless backhaul link 341 meets one or more of the performance criteria (405), WLAN access node 330 continues to provide (404) backhaul for the communications of WLAN 340 over first wireless backhaul link 341 and keeps alive second wireless backhaul link 342. WLAN access node 330 continues to monitor the performance criteria for first wireless backhaul link 341 when first wireless backhaul link 341 is in use, such as monitoring for disconnected states, performance below a performance threshold, or other performance criteria. In one example, the performance criteria can include an operational state, and the performance threshold can include when the operational state indicates an inoperative or disconnected state. In another example, the performance criteria can include a data transfer rate, and the performance threshold can include when the data transfer rate decreases below a predetermined data transfer value. In yet another example, the performance criteria can include a ping time, and the performance threshold can include when the ping time exceeds a predetermined time period.

When first wireless backhaul link 341 does not meet one or more of the performance criteria (405), WLAN access node 330 provides (406) backhaul for the communications over second wireless backhaul link 342. Since second wireless backhaul link 342 acts as a backup to first wireless backhaul link 341, the communications associated with WLAN 340 are backhauled over second wireless backhaul link 342 and WLAN access node 332 when first wireless backhaul link 341 becomes unavailable, such as when first wireless backhaul link 341 does not meet the performance criteria. In some examples, when first wireless backhaul link 341 returns to operation, such as meeting or exceeding one or more of the performance criteria, then WLAN 330 can return to providing backhaul for communications of WLAN 340 over first wireless backhaul link 341.

First wireless backhaul link 341 can comprise a first wireless link over a first wireless data link with a first wireless access node, such as WLAN access node 331, and can comprise a first wireless frequency spectrum, such as the 5 GHz IEEE 802.11 frequency spectrum. Second wireless backhaul link 342 can comprise a second wireless link over a second wireless data link with a second wireless access node, and can comprise the same or similar first wireless frequency spectrum as first wireless backhaul link 341. WLAN 340 can comprise an IEEE 802.11 wireless local area network, where first wireless backhaul link 341 for the backhaul communications of WLAN 340 comprises a first cellular data link, such as a first Long-Term Evolution (LTE) link, and where second wireless backhaul link 342 for the backhaul communications of WLAN 340 comprises a second cellular data link, such as a second LTE link or different wireless technology link. WLAN 340 can comprise a first IEEE 802.11 wireless local area network, where first wireless backhaul link 341 for the backhaul communications of WLAN 340 comprises a first IEEE 802.11 wireless link using a first wireless frequency spectrum, such as the 5 GHz IEEE 802.11 frequency spectrum, and second wireless backhaul link 342 for the backhaul communications of WLAN 340 can comprise a second IEEE 802.11 wireless link using the same or similar first wireless frequency spectrum, where WLAN access node 330 and WLAN access nodes 331-334 each comprise an IEEE 802.11 wireless local area network router, such as in a mesh configuration.

Figure 5:
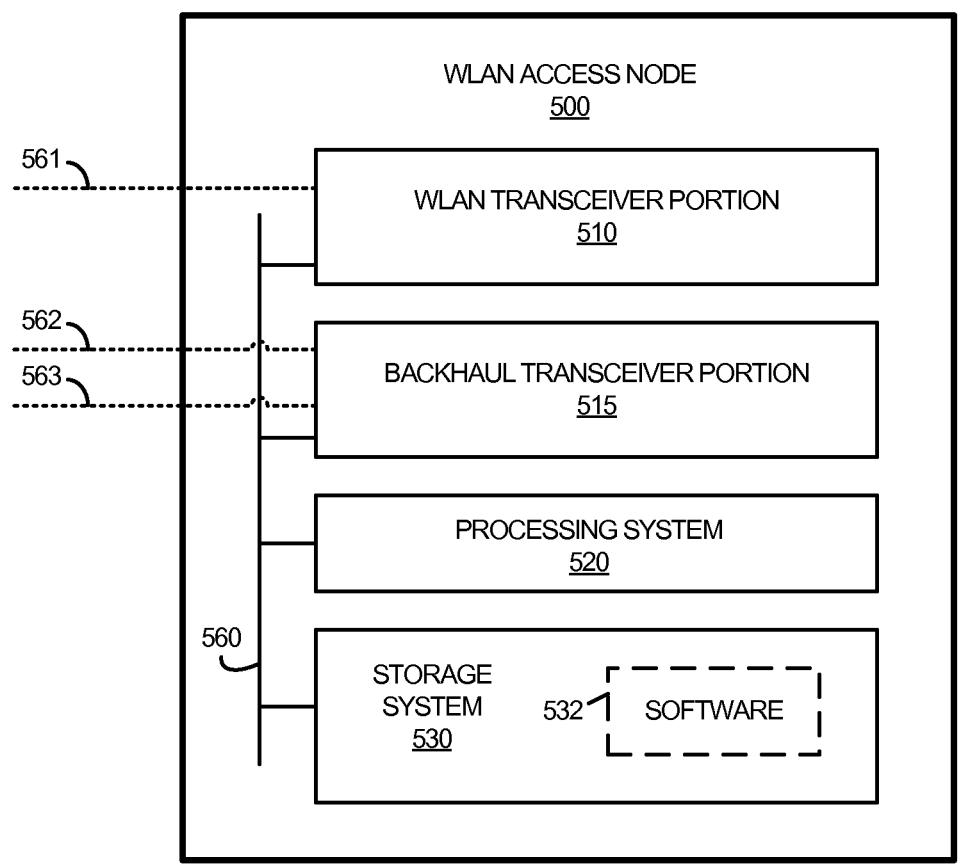
FIG. 5 is a block diagram illustrating a wireless local area network access node.

FIG. 5 is a block diagram illustrating WLAN access node 500, as an example of WLAN access node 120 found in FIG. 1 or WLAN access node 330 found in FIG. 3, although WLAN access node 120 or WLAN access node 330 could use other configurations. WLAN access node 500 includes WLAN transceiver portion 510, backhaul transceiver portion 515, processing system 520, and storage system 530. WLAN transceiver portion 510, backhaul transceiver portion 515, processing system 520, and storage system 530 are shown to communicate over a common bus 560 for illustrative purposes. It should be understood that discrete links could be employed, such as data links, power links, RF links, or other links. WLAN access node 500 can be distributed or consolidated among equipment or circuitry that together forms the elements of WLAN access node 500. WLAN access node 500 can optionally include additional devices, features, or functionality not discussed here for purposes of brevity.

WLAN transceiver portion 510 and backhaul transceiver portion 515 each comprise one or more antenna elements and communication interface circuitry for communicating with wireless access nodes of a wireless communication network, such as with other WLAN access nodes or base stations of a cellular voice and data network. WLAN transceiver portion 510 and backhaul transceiver portion 515 could each include transceiver equipment and antenna elements for wirelessly exchanging user communications and overhead communications over the associated wireless links 561-563, among further wireless links. WLAN transceiver portion 510 and backhaul transceiver portion 515 also each receive command and control information and instructions from processing system 520 for controlling the operations of wireless communications over wireless links 561-563. Wireless links 561-563 could use various protocols or communication formats as described herein for WLAN 140, wireless links 140-141, WLAN 340, or wireless links 341-342, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by WLAN access node 500 in general or processing system 520 in particular, direct WLAN access node 500 or processing system 520 to provide a wireless local area network for user devices, select a first wireless backhaul link for communications of the wireless local area network based on signal strength, and select a second wireless backhaul link as a backup for the first wireless backhaul link based on at least signal strengths and uptime information, among other operations. Software 532 can also include data structures which indicate signal strengths and uptime information for various wireless links or wireless access nodes, such as table 360 of FIG. 3. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to provide a wireless local area network for user devices, select a first wireless backhaul link for communications of the wireless local area network based on signal strength, and select a second wireless backhaul link as a backup for the first wireless backhaul link based on at least signal strengths and uptime information.

In general, software 532 can, when loaded into processing system 520 and executed, transform processing system 520 overall from a general-purpose computing system into a special-purpose computing system customized to provide a wireless local area network for user devices, select a first wireless backhaul link for communications of the wireless local area network based on signal strength, and select a second wireless backhaul link as a backup for the first wireless backhaul link based on at least signal strengths and uptime information, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Bus 560 comprises a physical, logical, or virtual communication link, capable of communicating data, control signals, and communications, along with other information. Bus 560 also can include RF and power distribution elements, such as wires, circuit board traces, or other elements. In some examples, portions of bus 560 are encapsulated within the elements of WLAN transceiver portion 510, backhaul transceiver portion 515, processing system 520, and storage system 530, and can be a software or logical link. In other examples, bus 560 uses various communication media, such as air, space, metal, optical fiber, or some other signal propagation path, including combinations thereof. Bus 560 could be a direct link or might include various equipment, intermediate components, systems, and networks.

Referring back to FIG. 1, user devices 110-112 each can comprise one or more antennas, transceiver circuitry elements, and communication elements. The transceiver circuitry typically includes amplifiers, filters, modulators, and signal processing circuitry. User devices 110-112 can also each include user interface systems, memory devices, non-transitory computer-readable storage mediums, software, processing circuitry, or some other communication components. User devices 110-112 can each be a wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

WLAN access node 120 provides WLAN 140 and associated backhaul for wireless access to communication services for at least user devices 110-112. WLAN access node 120 comprises RF communication and control circuitry, transceivers, and antennas, as well as wireless communications equipment capable of communicating with and providing wireless access within a wireless coverage area to communication services for user devices 110-112. The RF communication circuitry typically includes amplifiers, filters, RF modulators, transceivers, and signal processing circuitry. WLAN access node 120 can comprise processing and communication elements as described for WLAN access node 500 in FIG. 5. WLAN access node 120 can also comprise elements such as a wireless router, wireless bridge, wireless access point, WiFi equipment, IEEE 802.11 wireless router equipment, or other wireless LAN equipment, including combinations thereof.

Wireless access nodes 121-123 can each comprise wireless routers, wireless bridges, wireless access points, WiFi equipment, IEEE 802.11 wireless router equipment, or other wireless and wired LAN and communication equipment, such as described for WLAN access node 120. In other examples, wireless access nodes 121-123 each comprise base stations, base transceiver stations (BTS), E-UTRAN Node B equipment, eNodeB equipment, Evolved Node B equipment, or Evolved Universal Terrestrial Radio Access (E-UTRA) network equipment, including combinations thereof.

Wireless local area network (WLAN) 140 comprises an IEEE 802.11 wireless LAN, which can be provided over at least 2.4, 3.6, 5 and 60 GHz frequency bands and can employ Orthogonal Frequency-Division Multiplexing (OFDM) or spread spectrum techniques. WLAN 140 can comprise IEEE 802.11a, 802.11b, 802.11g, 802.11n, 802.11ac, or 802.11ad wireless communication protocols, including combinations, variations, and improvements thereof. In other examples, WLAN 140 comprises another wireless communication standard which allows for a wireless network access for user devices 110-112.

Wireless links 141-142 and 151-153 can each use the air or space as the transport media. Wireless links 141-142 and 151-153 each comprise one or more wireless communication links provided over associated wireless frequency spectrum or wireless frequency bands, and can use various protocols. Wireless links 141-142 and 151-153 can each comprise a wireless local area network as described for WLAN 140, or can each comprise a wireless link such as IEEE 802.11, Wireless Fidelity (Wi-Fi), Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), 3rd Generation Partnership Project (3GPP) Worldwide Interoperability for Microwave Access (WiMAX), Long Term Evolution (LTE), LTE Advanced, Orthogonal Frequency-Division Multiple Access (OFDMA), Orthogonal Frequency-Division Multiplexing (OFDM), Single-carrier frequency-division multiple access (SC-FDMA), Wideband Code Division Multiple Access (W-CDMA), Time Division Synchronous Code Division Multiple Access (TD-SCDMA), or some other cellular or wireless communication format, including combinations, improvements, or variations thereof.

Although one main wireless link for each of wireless links 140-142 and 151-153 is shown in FIG. 1, it should be understood that wireless links 140-142 and 151-153 are merely illustrative to show communication modes or wireless access pathways for user devices 110-112 and associated backhaul. In other examples, further wireless links can be shown, with portions of the further wireless links shared and used for different communication sessions or different content types, among other configurations. Although wireless links 141-142 and 151-153 are shown as a wireless link in FIG. 1, a wired link can be employed, or portions of links 141-142 and 151-153 can include wired portions.

Wireless links 140-142 and 151-153 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access node, the method comprising:
  providing a wireless local area network for user devices;
  selecting a first wireless backhaul link for communications of the wireless local area network from among a plurality of wireless links provided by a plurality of wireless access nodes based on at least signal strengths of the wireless links;
  selecting a second wireless backhaul link as a backup for the first wireless backhaul link from among the plurality of wireless links based on at least the signal strengths and uptime information of the wireless links, wherein the uptime information of the wireless links indicates a time period that each of the wireless links has been active and capable of carrying communications.

2. The method of claim 1, further comprising:
providing backhaul for the communications of the wireless local area network over the first wireless backhaul link unless performance criteria of the first wireless backhaul link is not met, then providing the backhaul for the communications of the wireless local area network over the second wireless backhaul link.

3. The method of claim 2, wherein the performance criteria comprises the first wireless backhaul link being operational.

4. The method of claim 2, further comprising:
keeping active the second wireless backhaul link when the performance criteria for the first wireless backhaul link is met.

5. The method of claim 4, further comprising:
wherein keeping active the second wireless backhaul link when the performance criteria for the first wireless backhaul link is met comprises periodically transferring keep alive messages over the second wireless backhaul link.

6. The method of claim 1, wherein the first wireless backhaul link comprises a first wireless link over a first wireless data link with a first wireless access node and comprising a first wireless frequency spectrum, and wherein the second wireless backhaul link comprises a second wireless link over a second wireless data link with a second wireless access node and comprising the first wireless frequency spectrum.

7. The method of claim 1, further comprising:
providing backhaul for the communications of the wireless local area network over the first wireless backhaul link; and
keeping active the second wireless backhaul link when backhaul for the communications are provided over the first wireless backhaul link.

8. The method of claim 1, wherein the wireless local area network for the user devices comprises an IEEE 802.11 wireless local area network, wherein the first wireless backhaul link for the communications of the wireless local area network comprises a first cellular data link, and wherein the second wireless backhaul link for the communications of the wireless local area network comprises a second cellular data link.

9. The method of claim 1, wherein the wireless local area network for the user devices comprises a first IEEE 802.11 wireless local area network, wherein the first wireless backhaul link for the communications of the wireless local area network comprises a first IEEE 802.11 wireless link using a first wireless frequency spectrum, and wherein the second wireless backhaul link for the communications of the wireless local area network comprises a second IEEE 802.11 wireless link using the first wireless frequency spectrum.

10. The method of claim 1, wherein the wireless access node and the plurality of wireless access nodes each comprises an IEEE 802.11 wireless local area network router.

11. A wireless access node, comprising:
a transceiver system configured to provide a wireless local area network for user devices;
a processor configured to select a first wireless backhaul link for communications of the wireless local area network from among a plurality of wireless links provided by a plurality of wireless access nodes based on at least signal strengths of the wireless links;
the processor configured to select a second wireless backhaul link as a backup for the first wireless backhaul link from among the plurality of wireless links based on at least the signal strengths and uptime information of the wireless links, wherein the uptime information of the wireless links indicates a time period that each of the wireless links has been active and capable of carrying communications.

12. The wireless access node of claim 11, comprising:
the transceiver system configured to provide backhaul for the communications of the wireless local area network over the first wireless backhaul link unless performance criteria of the first wireless backhaul link is not met, then provide the backhaul for the communications of the wireless local area network over the second wireless backhaul link.

13. The wireless access node of claim 12, wherein the performance criteria comprises the first wireless backhaul link being operational.

14. The wireless access node of claim 12, comprising:
the transceiver system configured to keep active the second wireless backhaul link when the performance criteria for the first wireless backhaul link is met.

15. The wireless access node of claim 14, comprising:
the transceiver system configured to periodically transfer keep alive messages over the second wireless backhaul link to keep active the second wireless backhaul link.

16. The wireless access node of claim 11, wherein the first wireless backhaul link comprises a first wireless link over a first wireless data link with a first wireless access node and comprising a first wireless frequency spectrum, and wherein the second wireless backhaul link comprises a second wireless link over a second wireless data link with a second wireless access node and comprising the first wireless frequency spectrum.

17. The wireless access node of claim 11, comprising:
the transceiver system configured to provide backhaul for the communications of the wireless local area network over the first wireless backhaul link; and
the transceiver system configured to keep active the second wireless backhaul link when backhaul for the communications are provided over the first wireless backhaul link.

18. The wireless access node of claim 11, wherein the wireless local area network for the user devices comprises an IEEE 802.11 wireless local area network, wherein the first wireless backhaul link for the communications of the wireless local area network comprises a first cellular data link, and wherein the second wireless backhaul link for the communications of the wireless local area network comprises a second cellular data link.

19. The wireless access node of claim 11, wherein the wireless local area network for the user devices comprises a first IEEE 802.11 wireless local area network, wherein the first wireless backhaul link for the communications of the wireless local area network comprises a first IEEE 802.11 wireless link using a first wireless frequency spectrum, and wherein the second wireless backhaul link for the communications of the wireless local area network comprises a second IEEE 802.11 wireless link using the first wireless frequency spectrum.

20. The wireless access node of claim 11, wherein the wireless access node and the plurality of wireless access nodes each comprises an IEEE 802.11 wireless local area network router.

* * * * *